(12) United States Patent
Morton et al.

(10) Patent No.: US 12,466,544 B1
(45) Date of Patent: Nov. 11, 2025

(54) SRV OPEN ROTOR WITH CORE INLET FORWARD OF ROTOR

(71) Applicant: RTX Corporation, Farmington, CT (US)

(72) Inventors: Jeffrey T. Morton, Manchester, CT (US); Dmytro M. Voytovych, Rocky Hill, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/661,272

(22) Filed: May 10, 2024

(51) Int. Cl.
*B64C 11/06* (2006.01)
*B64C 11/14* (2006.01)
*F01D 5/02* (2006.01)
*F01D 7/00* (2006.01)

(52) U.S. Cl.
CPC .............. *B64C 11/06* (2013.01); *B64C 11/14* (2013.01); *F01D 5/02* (2013.01); *F01D 7/00* (2013.01); *F05D 2220/323* (2013.01)

(58) Field of Classification Search
CPC ......... B64C 11/06; B64C 11/14; B64C 11/48; B64C 11/003; B64C 11/30; B64C 11/24; B64C 11/16; F01D 7/00; F01D 5/30; F01D 5/282; F01D 5/147; F01D 5/02; F01D 5/3023; F01D 5/32; F01D 17/162; F01D 5/323; F01D 21/045; F01D 5/12; F01D 5/14; F01D 5/18; B29D 99/0025; B29D 99/0028; F05D 2260/74; F05D 2240/30; F05D 2220/323; F05D 2220/36; F05D 2260/79; F05D 2220/32; F05D 2220/325; F05D 2230/64; F05D 2260/70; F05D 2260/36; F04D 29/323; F04D 29/362; F04D 29/34; F04D 29/324; F04D 29/322; F04D 29/329; F04D 29/36; F05B 2260/74
See application file for complete search history.

(56) References Cited

U.S. PATENT DOCUMENTS

| 2,885,013 | A | * | 5/1959 | Steiner | ..................... F01P 5/043 416/169 A |
| 3,468,473 | A | * | 9/1969 | Chilman | .................... F02K 1/66 416/157 R |
| 4,732,538 | A | | 3/1988 | Wollenweber et al. | |
| 4,751,816 | A | | 6/1988 | Perry | |
| 4,758,129 | A | * | 7/1988 | Strock | ..................... F02K 3/072 416/157 R |

(Continued)

FOREIGN PATENT DOCUMENTS

WO 8910300 A1 11/1989

OTHER PUBLICATIONS

European Search Report dated Sep. 10, 2025, in connection with European Patent Application No. 25175793.6, 9 pages.

*Primary Examiner* — Eric J Zamora Alvarez

(57) ABSTRACT

An aircraft propulsion system includes a rotor hub, rotor blades, a rotating frame, and a low-pressure compressor. The rotor hub is configured to rotate about a central axis. The rotor blades are arranged around the rotor hub. Each of the rotor blades is configured to rotate about a radial axis of the rotor hub. The rotating frame is positioned between the rotor hub and the plurality of rotor blades. The rotating frame is configured to allow air to pass without interference of the rotor blades. The low-pressure compressor is configured to receive the air passing through the rotating frame.

19 Claims, 7 Drawing Sheets

(56) References Cited

U.S. PATENT DOCUMENTS

| | | | |
|---|---|---|---|
| 4,976,102 A | 12/1990 | Taylor | |
| 5,039,278 A | 8/1991 | Wakeman et al. | |
| 8,689,538 B2* | 4/2014 | Sankrithi | B64D 27/14 |
| | | | 60/226.1 |
| 8,974,175 B2 | 3/2015 | Domercq et al. | |
| 9,228,535 B2 | 1/2016 | Magowan | |
| 9,284,041 B2* | 3/2016 | Belmonte | F01D 7/00 |
| 10,556,699 B2* | 2/2020 | Pautis | B64D 27/12 |
| 10,640,198 B2* | 5/2020 | Colmagro | F16D 1/0894 |
| 11,225,317 B2* | 1/2022 | Boudebiza | B64C 11/308 |
| 2013/0115083 A1* | 5/2013 | Vuillemin | B64C 11/003 |
| | | | 416/129 |
| 2015/0361806 A1 | 12/2015 | Roach | |

\* cited by examiner

SRV OPEN ROTOR WITH CORE INLET FORWARD OF ROTOR

TECHNICAL FIELD

This disclosure relates generally to an aircraft. More specifically, this disclosure relates to an open rotor propulsion system with a core inlet forward of the rotor.

BACKGROUND

A rotor with SRVs is one type of open rotor architecture. Traditionally, an SRV configuration has the core inlet located axially between the rotor blades and the static vanes.

SUMMARY

This disclosure provides an open rotor propulsion system with a core inlet forward of the rotor and SRV.

In a first embodiment, an aircraft propulsion system includes a rotor hub, rotor blades, a rotating frame, and a low-pressure compressor. The rotor hub is configured to rotate about a central axis. The rotor blades are arranged around the rotor hub. Each of the rotor blades is configured to rotate about a radial axis of the rotor hub. The rotating frame is positioned between the rotor hub and the plurality of rotor blades. The rotating frame is configured to allow air to pass without interference of the rotor blades. The low-pressure compressor is configured to receive the air passing through the rotating frame.

In certain embodiments, the rotating frame includes a plurality of struts supporting a rotating inlet splitter.

In certain embodiments, the aircraft propulsion system further includes a rotor spar for each of the rotor blades. The rotor spar is configured to connect a rotor blade to the rotor hub through each strut.

In certain embodiments, the rotor hub comprises a variable pitch mechanism configured to vary a pitch of the rotor blades.

In certain embodiments, the aircraft propulsion system includes a static frame configured to support the rotor hub through a bearing system and a fan drive gear system and guide air from the rotating frame towards a low-pressure compressor.

In certain embodiments, the static frame includes struts supporting the fan drive gear system and the bearing system supporting the rotor hub.

In certain embodiments, the aircraft propulsion system includes a spinner configured to direct air towards an opening of the rotating frame.

In a second embodiment, an apparatus includes a rotor hub, a plurality of rotor blades, and a rotating frame. The rotor hub is configured to rotate about a central axis. The rotor blades are arranged around the rotor hub. Each of the rotor blades is configured to rotate about a radial axis of the rotor hub. The rotating frame is positioned between the rotor hub and the plurality of rotor blades. The rotating frame is configured to allow air to pass without interference of the rotor blades.

In certain embodiments, the rotating frame includes a plurality of struts supporting a rotating inlet splitter.

In certain embodiments, the apparatus further includes a rotor spar for each of the rotor blades. The rotor spar is configured to connect a rotor blade to the rotor hub through each strut.

In certain embodiments, the rotor hub comprises a variable pitch mechanism configured to vary a pitch of the rotor blades.

In certain embodiments, the apparatus includes a static frame configured to support the rotor hub through a bearing system and a fan drive gear system and guide air from the rotating frame towards a low-pressure compressor.

In certain embodiments, the static frame includes struts supporting the fan drive gear system and the bearing system supporting the rotor hub.

In certain embodiments, the apparatus includes a spinner configured to direct air towards an opening of the rotating frame.

In a third embodiment, a method includes for an aircraft propulsion system including a rotor hub configured to rotate about a central axis, a plurality of rotor blades arranged around the rotor hub, each of the rotor blades configured to rotate about a radial axis of the rotor hub, and a rotating frame positioned between the rotor hub and the plurality of rotor blades, comprises passing air through the rotating frame without interference of the rotor blades. The method also includes receiving the air passing through the rotating frame in a low-pressure compressor.

In certain embodiments, the rotating frame includes a plurality of struts supporting a rotating inlet splitter.

In certain embodiments, the method further includes rotating the rotor blades using a variable pitch mechanism of the rotor hub through each strut.

In certain embodiments, a rotor spar for each of the rotor blades connects a rotor blade to the rotor hub through each strut.

In certain embodiments, the method further includes passing the air from the rotating frame through a static frame supporting the rotor hub through a bearing system and a fan drive gear system. The static frame includes struts supporting the fan drive gear system and the bearing system supporting the rotor hub.

In certain embodiments, the method further includes directing, using a spinner, air towards an opening of the rotating frame.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1A:
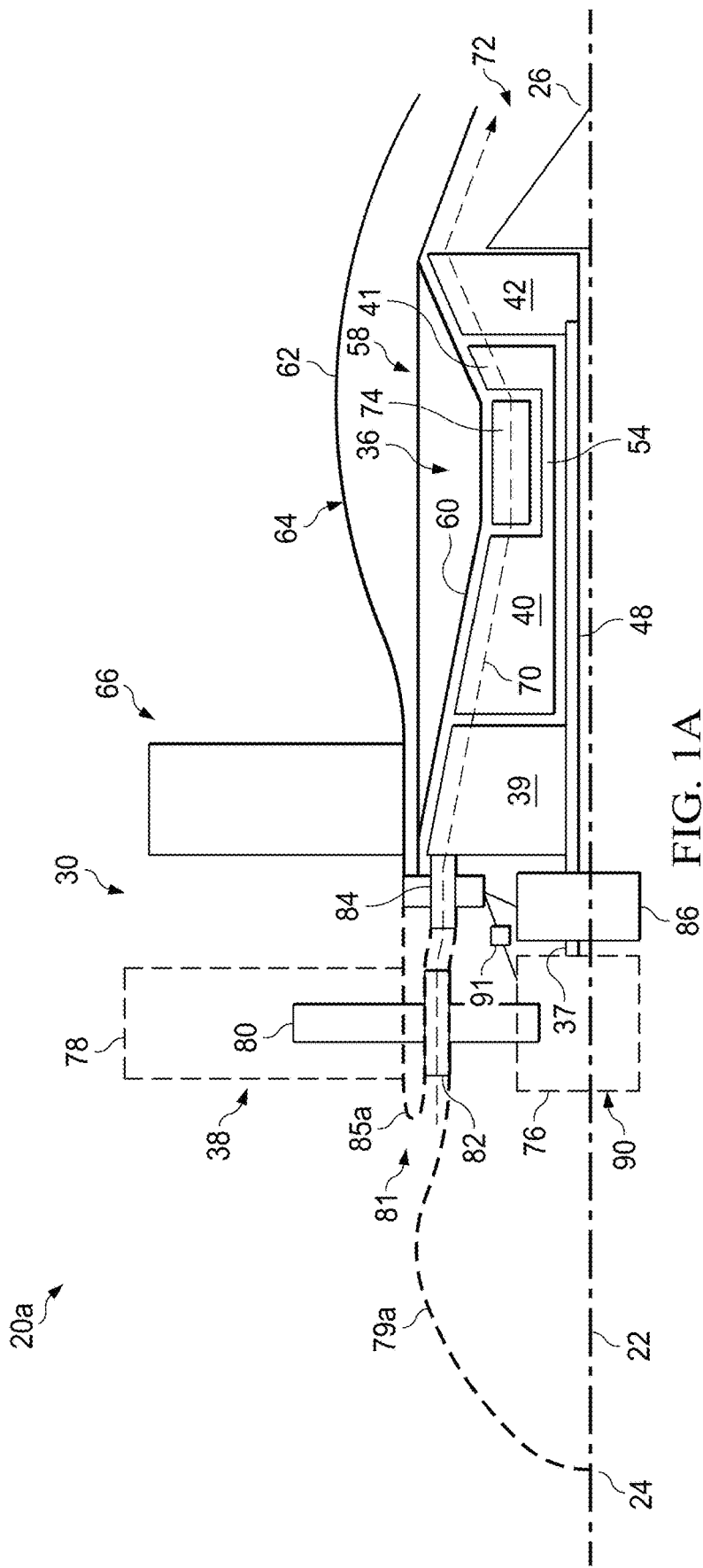
FIGS. 1A through 1D are side schematic illustrations of example aircraft propulsion systems in accordance with this disclosure.
Figure 1B:
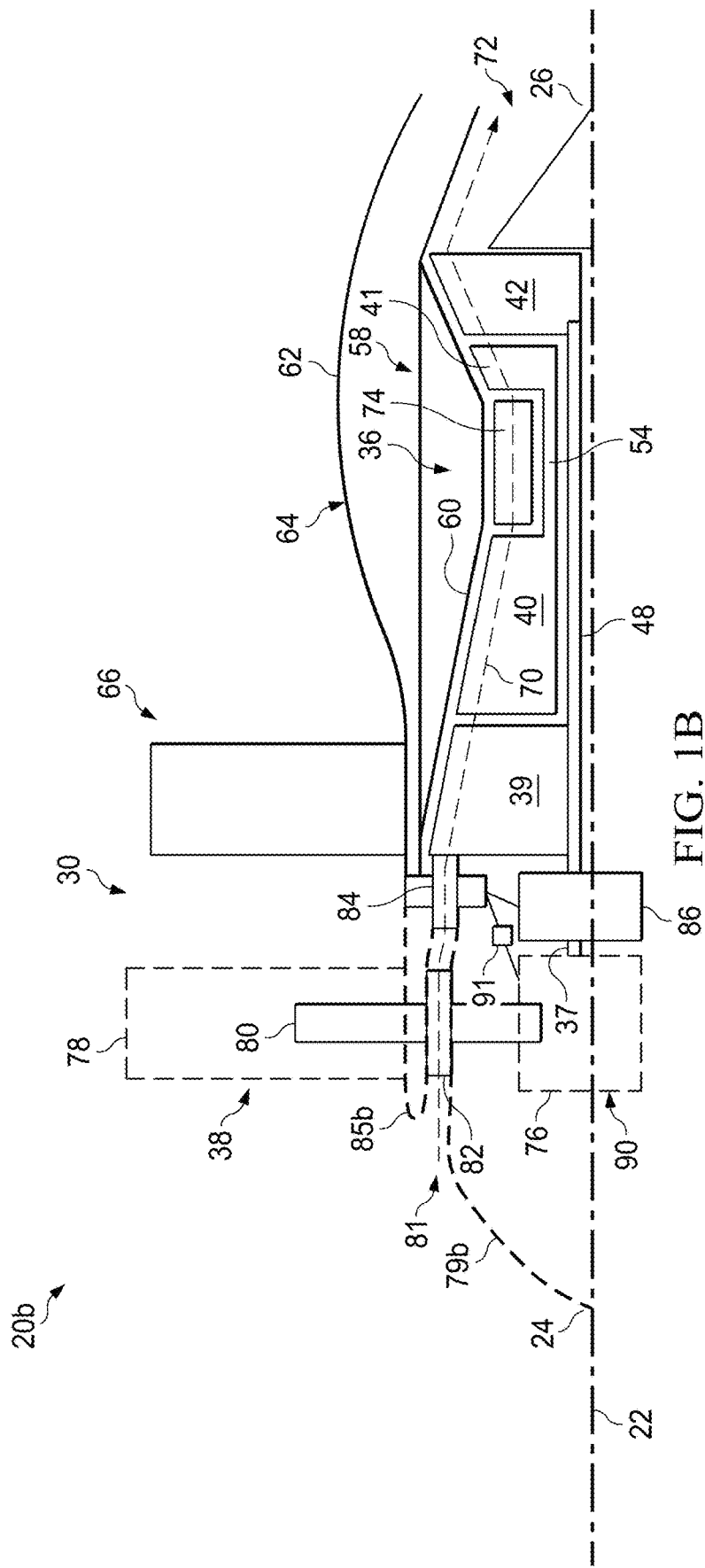
Figure 1C:
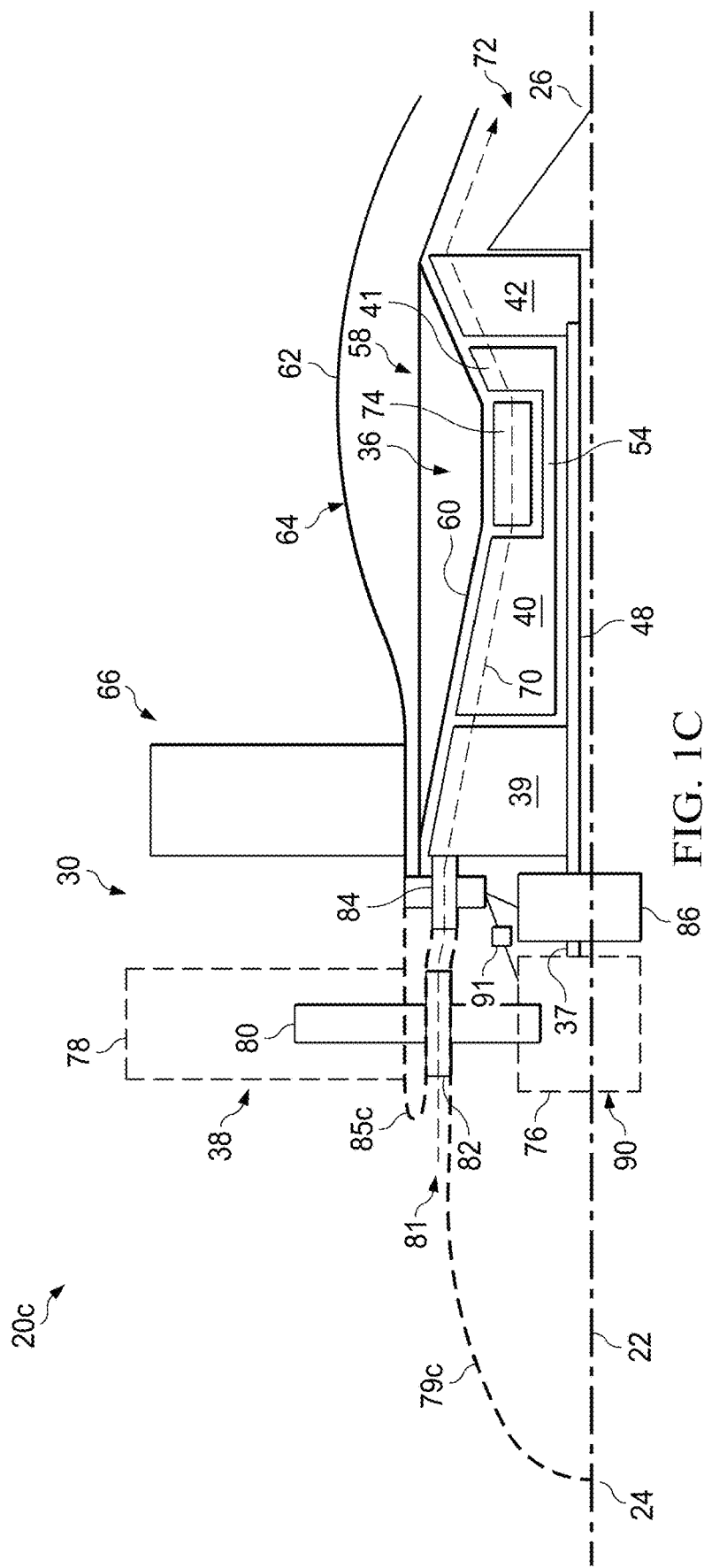
Figure 1D:
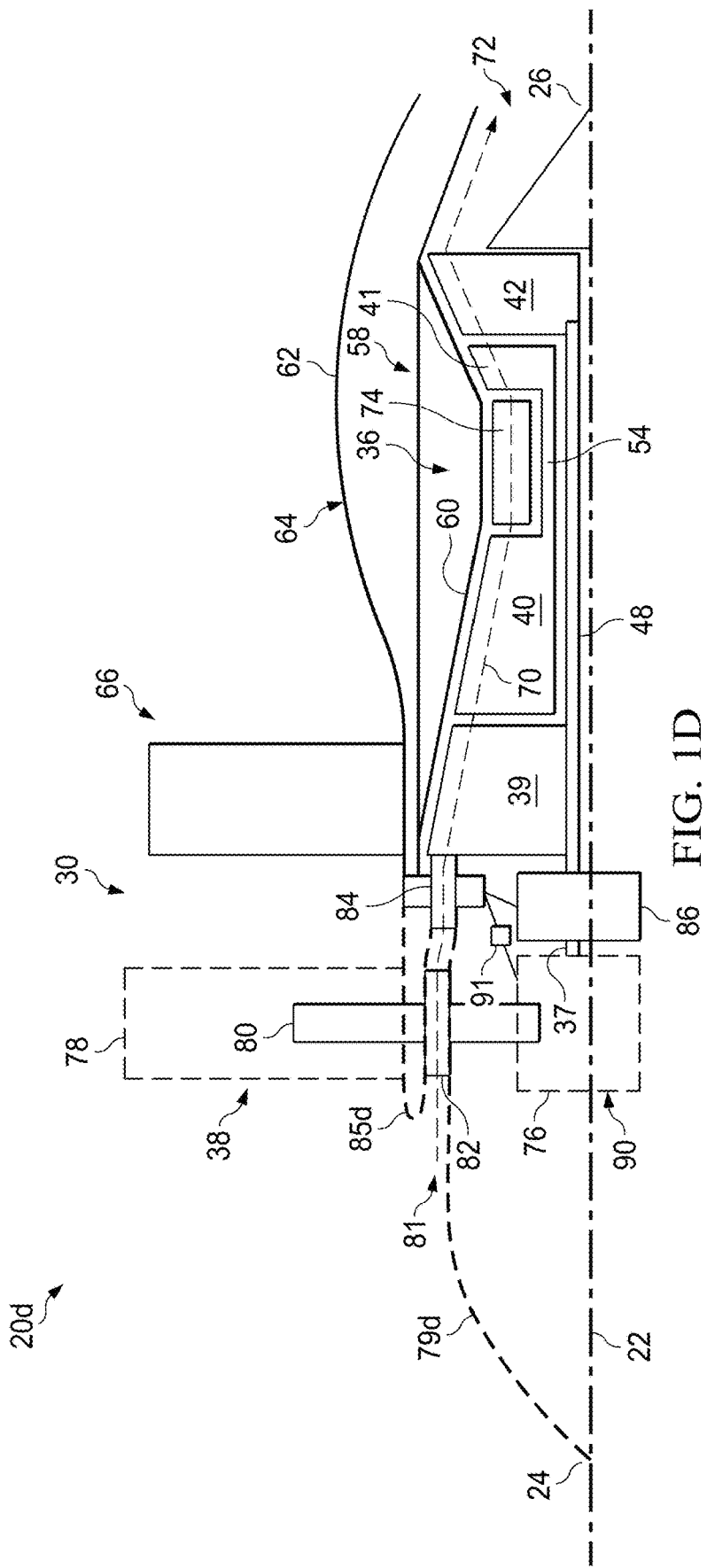
Figure 2A:
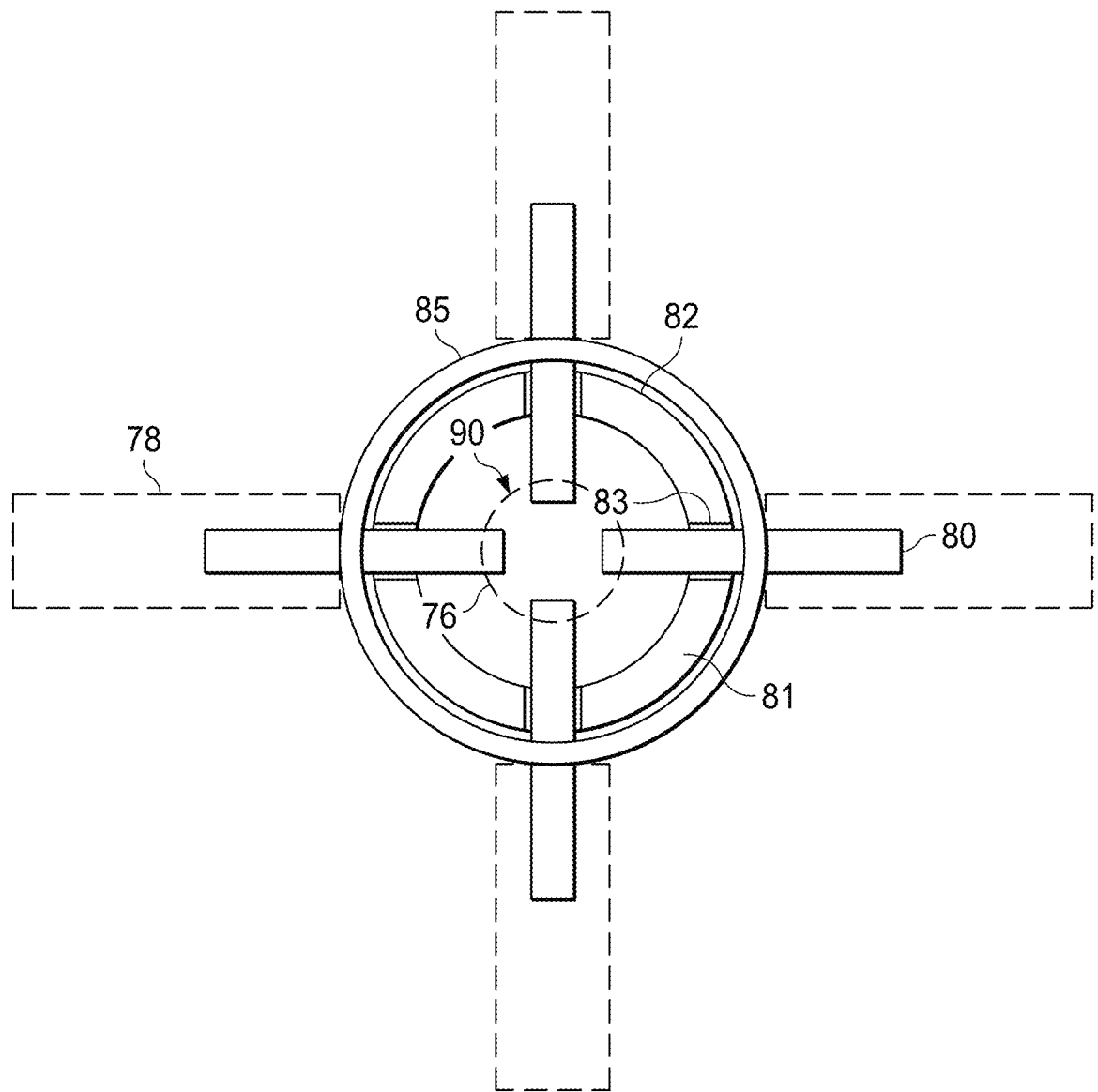
FIGS. 2A and 2B illustrate example front schematic views of the bladed propulsor rotor and support structure in accordance with this disclosure.
Figure 2B:
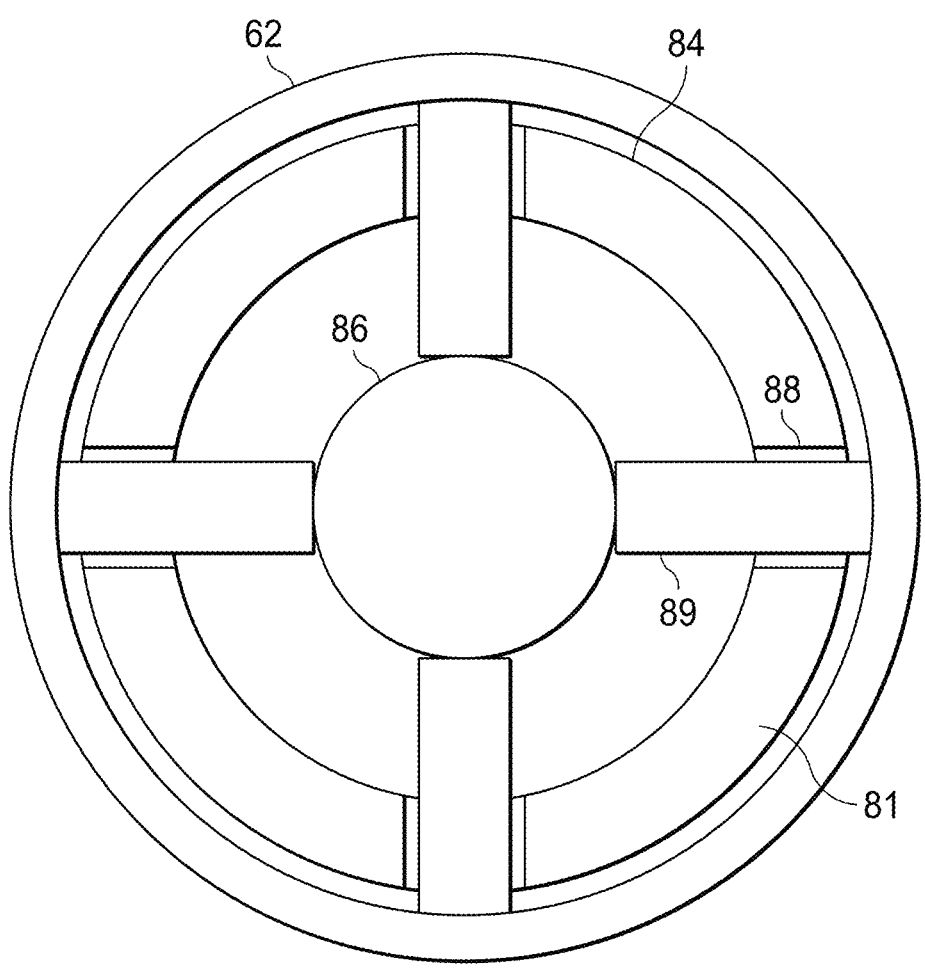
Figure 3:
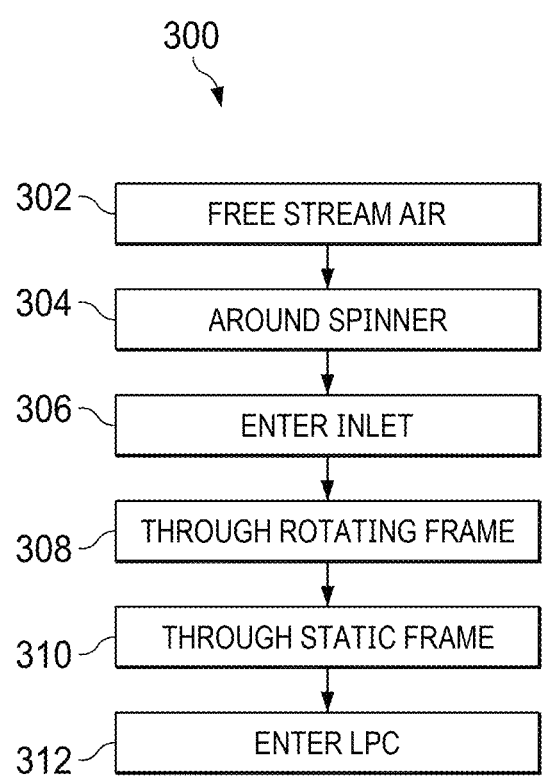
FIG. 3 illustrates an example method for operating an SRV open rotor with a core inlet forward of a rotor according to this disclosure.

FIGS. 1 through 3, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

Positioning the core inlet downstream of the rotor allows the root portion of the rotor to do work on the air before it enters the core and mimics the approach of a turbo fan, where the root of the fan acts as a pre-stage of the low-pressure compressor (LPC). Balancing the rotor aerodynamic design to both maximize propulsive efficiency (portion of flow that bypasses the core) and condition the flow through the root that feeds the core is challenging. At high angles of attack, the spinner can create a large blockage leading to non-uniform (in the circumferential direction) flow entering the core, which impacts compressor stability. Variable rotor pitch may be used to control the rotor power and thrust; however, this may disturb the flow of air into the core.

FIGS. 1A through 1D illustrate propulsion systems 20a through 20d for an aircraft in accordance with this disclosure. FIGS. 2A and 2B illustrate example front schematic views of a bladed propulsor rotor and support structure in accordance with this disclosure. The propulsor rotor depicted in FIG. 2A includes four variable pitch rotor blades 78 for simplicity of the schematic representation. However, the quantity of variable pitch rotor blades 78 may be more or less than four. The aircraft may be an airplane, a drone (e.g., an unmanned aerial vehicle (UAV)) or any other manned or unmanned aerial vehicle or system. The aircraft propulsion systems 20a through 20d extend axially along an axis 22 between a forward, upstream end 24 of the aircraft propulsion systems 20a through 20d and an aft, downstream end 26 of the aircraft propulsion systems 20a through 20d. The axis 22 may be a centerline axis of the aircraft propulsion systems 20a through 20d and/or one or more of its members. The axis 22 may also or alternatively be a rotational axis of one or more members of the aircraft propulsion systems 20a through 20d.

The aircraft propulsion systems 20a through 20d of FIGS. 1A through 1D are configured as open rotor propulsion systems; e.g., single rotor and swirl recovery vane (SRV) open rotor propulsion systems. Here, the term "open" may describe a propulsion system section and/or a propulsion system component which is open to an environment (e.g., an ambient environment) external to the aircraft propulsion systems 20a through 20d and, more generally, the aircraft. The aircraft propulsion systems 20a through 20d of FIGS. 1A through 1D, for example, include an open propulsion section 30, a compressor section, a combustor section, and a turbine section. The compressor section of FIGS. 1A through 1D includes a low-pressure compressor (LPC) section and a high-pressure compressor (HPC) section. The turbine section of FIGS. 1A through 1D includes a high-pressure turbine (HPT) section and a low-pressure turbine (LPT) section. At least (or only) the LPC section, the HPC section, the combustor section, the HPT section and the LPT section collectively form a gas generator 36; e.g., a turbine engine core.

The propulsion section 30 includes a bladed propulsor rotor 38. The propulsor rotor 38 of FIGS. 1A through 1D is configured as an open rotor (e.g., an un-ducted rotor) which projects radially into and is exposed to the external environment. The propulsor rotor 38 includes a rotor hub 76 including variable pitch mechanics 90, variable pitch rotor blades 78, rotor spar 80, and rotating frame 82.

The LPC section includes a low-pressure compressor (LPC) rotor 39. The HPC section includes a high-pressure compressor (HPC) rotor 40. The HPT section includes a high-pressure turbine (HPT) rotor 41. The LPT section includes a low-pressure turbine (LPT) rotor 42. Each of the bladed rotors 39-42 of FIGS. 1A through 1D is configured as a ducted rotor internal within the aircraft propulsion systems 20a through 20d and outside of the external environment.

The propulsor rotor 38 of FIGS. 1A through 1D is connected to a propulsor shaft 37. At least (or only) the propulsor rotor 38 and the propulsor shaft 37 collectively form a propulsor rotating assembly. This propulsor rotating assembly and its members are rotatable about the axis 22.

The LPC rotor 39 is coupled to and rotatable with the LPT rotor 42. The LPC rotor 39 of FIGS. 1A through 1D, for example, is connected to the LPT rotor 42 through a low-speed shaft 48. At least (or only) the LPC rotor 39, the LPT rotor 42 and the low-speed shaft 48 collectively form a low-speed rotating assembly; e.g., a low-speed spool of the gas generator 36. This low-speed rotating assembly of FIGS. 1A through 1D and its members 39, 42, and 48 are rotatable about the axis 22; however, it is contemplated the low-speed rotating assembly may alternatively be rotatable about another axis radially and/or angularly offset from the axis 22. Referring again to FIGS. 1A through 1D, the low-speed rotating assembly is also coupled to the propulsor rotating assembly. The low-speed rotating assembly of FIGS. 1A through 1D, for example, is connected to the propulsor rotating assembly through a fan drive gear system (FDGS) 86; e.g., an epicyclic gear system, a transmission, etc. With this arrangement, the low-speed rotating assembly and its LPT rotor 42 may rotate at a different (e.g., faster) rotational velocity than the propulsor rotating assembly and its propulsor rotor 38. However, it is contemplated the propulsor rotor 38 may alternatively be coupled to the low-speed rotating assembly and its LPT rotor 42 without the FDGS 86 such that the LPT rotor 42 may directly drive rotation of the propulsor rotor 38 through a shaft (e.g., the low-speed shaft 48) or a shaft assembly.

The HPC rotor 40 is coupled to and rotatable with the HPT rotor 41. The HPC rotor 40 of FIGS. 1A through 1D, for example, is connected to the HPT rotor 41 through a high-speed shaft 54. At least (or only) the HPC rotor 40, the HPT rotor 41 and the high-speed shaft 54 collectively form a high-speed rotating assembly; e.g., a high-speed spool of the gas generator 36. This high-speed rotating assembly of FIGS. 1A through 1D and its members 40, 41, and 54 are rotatable about the axis 22; however, it is contemplated the high-speed rotating assembly may alternatively be rotatable about another axis radially and/or angularly offset from the axis 22.

The engine sections may be arranged sequentially along the axis 22 and are housed within a stationary housing 58 of the aircraft propulsion systems 20a through 20d. This propulsion system housing 58 includes a gas generator case 60 (e.g., a core case) and a nacelle 62. The generator case 60 houses one or more of the propulsion system sections; e.g., the gas generator 36. The generator case 60 of FIGS. 1A through 1D, for example, extends axially along (e.g., axially overlaps) and extends circumferentially about (e.g., circumscribes) the engine sections and their respective bladed rotors 39-42. The generator case 60 may also house the FDGS 86. The nacelle 62 houses and provides an aerodynamic cover over the generator case 60. An exterior wall 64 of the nacelle 62 of FIGS. 1A through 1D, for example, is disposed radially outboard of, extends axially along (e.g., axially overlaps) and extends circumferentially about (e.g., circumscribes) the gas generator 36 and its generator case 60. With this arrangement, the bladed rotors 39-42 are disposed within the propulsion system housing 58. The propulsor rotor 38 is disposed at least partially (or completely) outside of the propulsion system housing 58.

During operation of the aircraft propulsion systems 20a through 20d, ambient air within the external environment is directed by the spinners 79a through 79d around the propulsion systems 20a through 20d and propelled by the propulsor rotor 38 in an aft, downstream direction towards the propulsion system downstream end 26. The spinners 79a through 79d are designed to direct air to the front opening of the rotating frame 82. The front opening of the rotating frame 82 is the air inlet 81 of the core flow path 70. An outer stream of the air propelled by the propulsor rotor 38, for example, flows axially across the variable pitch rotor blades 78 and the variable pitch stators 66 and outside of the propulsion system housing 58 (along the nacelle wall 64). An inner stream of the air is transferred through the rotating frame 82 of the propulsor rotor 38 and a static frame 84 along the core flow path 70 of the aircraft propulsion systems 20a through 20d and their gas generators 36. The core flow path 70 extends sequentially through the rotating frame 82, the static frame 84, the LPC section, the HPC section, the combustor section, the HPT section and the LPT section from the air inlet 81 to a combustion products exhaust 72 from the core flow path 70 into the external environment. The air entering the core flow path 70 may be referred to as "core air".

The core air is compressed by the LPC rotor 39 and the HPC rotor 40 and directed into a combustion chamber 74 (e.g., an annular combustion chamber) of a combustor (e.g., an annular combustor) in the combustor section. Fuel is injected into the combustion chamber 74 and mixed with the compressed core air to provide a fuel-air mixture. This fuel-air mixture is ignited and combustion products thereof flow through and sequentially drive rotation of the HPT rotor 41 and the LPT rotor 42. The rotation of the HPT rotor 41 and the LPT rotor 42 respectively drive rotation of the HPC rotor 40 and the LPC rotor 39 and, thus, compression of the air received from the air inlet 81. The rotation of the LPT rotor 42 also drives rotation of the propulsor rotor 38 through the FDGS 86. The rotation of the propulsor rotor 38, in turn, propels the ambient air within the external environment in the aft, downstream direction. A major portion (e.g., more than 50%) of this air bypasses the gas generator 36 to provide forward thrust while a minor portion (e.g., less than 50%) of the air flows into the gas generator 36. With this arrangement, the gas generator 36 powers operation of (e.g., drives rotation of) the propulsor rotor 38 during aircraft propulsion system operation.

The propulsor rotor 38 includes a propulsor rotor hub 76 (e.g., a disk or a hub) and a plurality of variable pitch rotor blades 78 (e.g., airfoils). The variable pitch rotor blades 78 are arranged circumferentially about the rotor hub 76 and the axis 22 in an array; e.g., a circular array. Each of the rotor blades 78 is connected to (e.g., formed integral with or otherwise attached to) rotor spars 80 connected to the rotor hub 76. The rotor hub 76 includes variable pitch mechanics 90 to rotate the variable pitch rotor blades around their respective radial axes from the rotor hub 76. The rotating frame 82 can rotate around the axis 22 along with the rotor blades 78. The rotating frame 82 also includes a plurality of struts 83 that the rotor spars 80 extend through the rotating frame 82. The rotating frame 82 allows for the airflow to reach the gas generator 36 regardless of the orientation of the variable pitch rotor blades 78. The rotating frame 82 supports a rotating flow structure (inlet splitter) 85a through 85d. The rotating flow structure 85a-85d can divide the air for the core flow path 70 and its air inlet 81 from the bypass air that passes around the rotating flow structure 85a-85d and through the array of rotor blades 78 and then passes through the array of variable pitch stators 66.

The core flow path 70 includes a static frame 84 that supports the FDGS 86, and the rotor hub 76 through a bearing system 91. The FDGS 86 connects the rotor hub 76 at its rotating output to the low-speed shaft 48 at its rotating input. The static frame 84 includes a plurality of struts 88 that form or allow support structure to pass through that form the fixed (e.g., non-rotating) supports 89 for the FDGS 86 and bearing system 91. Struts 88 of static frame 84 and supports 89 may be independent structures as depicted in FIG. 2B or may optionally be combined into a single component. The struts 88 of static frame 84 depicted in FIG. 2B includes four struts 88 for simplicity of the schematic representation. However, the quantity of struts 88 may be more or less than four. The plurality of struts 88 of static frame 84 may include the same quantity, more or less than the plurality of struts 83 of the rotating frame 82. A gap between the stator 66 and the propulsion rotor 38 can be reduced based on this core inlet architecture.

FIG. 3 illustrates an example method for operating an SRV open rotor with a core inlet forward of a rotor according to this disclosure. As shown in FIG. 3, the core flow begins as free stream air in the ambient environment in front of the aircraft propulsion systems 20a through 20d at step 302. The air passes around the spinners 79a through 79d at step 304. The spinner is designed to draw air along a surface of the aircraft propulsion systems 20a through 20d. The air is directed toward an air inlet 81 of the core flow path 70 at step 306. The air inlet 81 corresponds to the forward opening of the rotating frame 82.

The air passes through the rotating frame 82 and around its struts 83 at step 308. The rotating frame 82 includes struts 83 that provide a passage for the rotor spars 80 to pass through. The rotor spars 80 allow for the variable pitch rotor blades 78 to be rotated about a radial axis of the rotor hub 76 by the variable pitch mechanics 90 of the rotor hub 76.

The air passes through a static frame 84 at step 310. The static frame 84 includes a support structure 89 that extends through struts 88 and supports the FDGS 86 and the rotor hub 76 through a bearing system 91. The air enters the LPC section and its LPC rotor 39 at step 312 and continues through the remaining engine sections that collectively form the gas generator 36.

Although FIG. 3 illustrates an example method for operating an open rotor system with a rotor and SRV with a core inlet forward of the rotor, various changes may be made to FIG. 3. For example, various components in FIG. 3 may be combined, further subdivided, replicated, omitted, or rearranged and additional components may be added according to particular needs.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An aircraft propulsion system comprising:
   a rotor hub configured to rotate about a central axis;
   a plurality of rotor blades arranged around the rotor hub, each of the rotor blades configured to rotate about a radial axis of the rotor hub;
   a rotating frame positioned between the rotor hub and the plurality of rotor blades, the rotating frame defining a core inlet located forward of the plurality of rotor blades for receiving air to allow air to pass without interference of the rotor blades; and
   a low-pressure compressor configured to receive the air passing through the rotating frame.

2. The aircraft propulsion system of claim 1, wherein the rotating frame includes a plurality of struts supporting a rotating inlet splitter.

3. The aircraft propulsion system of claim 2, further comprising a rotor spar for each of the rotor blades, the rotor spar configured to connect a rotor blade to the rotor hub through each strut.

4. The aircraft propulsion system of claim 3, wherein the rotor hub comprises variable pitch rotor blades.

5. The aircraft propulsion system of claim 1, further comprising a static frame configured to support the rotor hub through bearings and a fan drive gear system and guide air from the rotating frame towards the low-pressure compressor.

6. The aircraft propulsion system of claim 5, wherein the static frame includes struts supporting the fan drive gear system and the bearings supporting the rotor hub.

7. The aircraft propulsion system of claim 1, further comprising a spinner configured to direct air towards the core inlet of the rotating frame.

8. An apparatus comprising:
   a rotor hub configured to rotate about a central axis;
   a plurality of rotor blades arranged around the rotor hub, each of the rotor blades configured to rotate about a radial axis of the rotor hub; and
   a rotating frame positioned between the rotor hub and the plurality of rotor blades, the rotating frame defining a core inlet located forward of the plurality of rotor blades for receiving air to allow air to pass without interference of the rotor blades, wherein the rotating frame includes a plurality of struts supporting a rotating inlet splitter.

9. The apparatus of claim 8, further comprising a rotor spar for each of the rotor blades, the rotor spar configured to connect a rotor blade to the rotor hub through each strut.

10. The apparatus of claim 9, wherein the rotor hub comprises variable pitch rotor blades.

11. The apparatus of claim 8, further comprising a static frame configured to support the rotor hub through bearings and a fan drive gear system and guide air from the rotating frame towards the low-pressure compressor.

12. The apparatus of claim 11, wherein the static frame includes struts supporting the fan drive gear system and the bearings supporting the rotor hub.

13. The apparatus of claim 8, further comprising a spinner configured to direct air towards the core inlet of the rotating frame.

14. A method for an aircraft propulsion system including a rotor hub configured to rotate about a central axis, a plurality of rotor blades arranged around the rotor hub, each of the rotor blades configured to rotate about a radial axis of the rotor hub, and a rotating frame positioned between the rotor hub and the plurality of rotor blades, the method comprising:
   passing air through a core inlet defined forward of the plurality of rotor blades by the rotating frame to enable the air to flow through the core inlet without interference of the rotor blades; and
   receiving the air passing through the core inlet in the rotating frame in a low-pressure compressor.

15. The method of claim 14, wherein the rotating frame includes a plurality of struts supporting a rotating inlet splitter.

16. The method of claim 15, further comprising:
   rotating the rotor blades of the rotor hub through each strut, wherein the rotor hub comprises variable pitch rotor blades.

17. The method of claim 16, wherein a rotor spar for each of the rotor blades connects a rotor blade to the rotor hub through each strut.

18. The method of claim 14, further comprising:
   passing the air from the core inlet of the rotating frame through a static frame supporting the rotor hub through bearings and a fan drive gear system,
   wherein the static frame includes struts supporting the fan drive gear system and the bearings supporting the rotor hub.

19. The method of claim 14, further comprising:
   directing, using a spinner, air towards the core inlet of the rotating frame.

* * * * *